United States Patent [19]

Blommers et al.

[11] 4,269,871

[45] May 26, 1981

[54] ANTILUMPING EXPANDABLE STYRENE POLYMERS

[75] Inventors: Elizabeth A. Blommers, Monroeville; William J. Poole; Alvin R. Ingram, both of Murrysville, all of Pa.

[73] Assignee: Arco Polymers, Inc., Philadelphia, Pa.

[21] Appl. No.: 164,442

[22] Filed: Jun. 30, 1980

[51] Int. Cl.³ .............................................. C08J 9/14
[52] U.S. Cl. ..................................... 427/222; 521/54; 521/57; 521/59; 521/60; 521/139; 525/96; 525/98; 525/313
[58] Field of Search ................... 521/54, 57, 60, 56, 521/59; 427/222

[56] References Cited

U.S. PATENT DOCUMENTS

| | | | |
|---|---|---|---|
| 2,857,339 | 10/1958 | Colwell | 521/59 |
| 2,857,340 | 10/1958 | Colwell | 521/59 |
| 2,862,834 | 12/1958 | Hiler | 521/54 |
| 3,060,138 | 10/1962 | Wright | 521/60 |
| 3,277,026 | 10/1966 | Newnham et al. | 521/54 |
| 3,819,546 | 6/1974 | Attores, Jr. | 521/57 |

*Primary Examiner*—Morton Foelak
*Attorney, Agent, or Firm*—Lewis J. Young

[57] ABSTRACT

Expandable styrene polymer particles are surface-coated with conjugated diene elastomers to prevent the particles from lumping together during expansion. The coating is applied by adding 0.05–0.25 part of conjugated diene elastomer to an aqueous suspension containing 100 parts of polymer particles during the impregnation of the mixture with a blowing agent.

4 Claims, No Drawings

ANTILUMPING EXPANDABLE STYRENE POLYMERS

BACKGROUND OF THE INVENTION

This invention relates to a process for making expandable styrene polymer particles non-lumping on pre-expansion.

The making of low density, cellular, shaped, plastic articles from expandable particles of styrene polymers is well-known. Such particles generally contain a blowing agent which boils below the softening point of the polymer and which will cause the particles to expand when they are heated.

The particles are generally pre-expanded before introduction into the mold to provide better fusion and less density variation in the molded article. Such a pre-expansion is described in U.S. Pat. No. 3,023,175 and U.S. Pat. No. 3,577,360.

These pre-expanded particles are placed into a mold cavity which defines the shape of the desired finished articles. The particles are heated above their softening point, whereupon the particles expand to fill the mold cavity and fuse together.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833 teaches the addition of lecithin during the impregnation of the particles with the blowing agent. Unfortunately, the lecithin imparts an undesirable odor to the molded articles. U.S. Pat. No. 3,462,293 teaches to coat the particles with polymeric materials by a fluid bed process. This process involves an additional expense of fluidizing the particles and coating with the polymer latexes. U.S. Pat. No. 3,444,104 teaches the addition of calcium silico aluminate. This additive tends to plug the equipment.

SUMMARY OF THE INVENTION

It has now been found that anti-lumping, pre-expanded particles having density of less than 2.00 pcf. are produced by coating styrene particles with a conjugated diene elastomer applied to the particles in an aqueous suspension during impregnation of the particles with expanding agent. The suitable conjugated diene elastomer is dissolved in a portion of or all of the expanding agent and added with the remainder, if any, of the expanding agent.

DETAILED DESCRIPTION OF THE INVENTION

In accordance with this invention, a variety of expandable thermoplastic homopolymers and copolymers can be rendered anti-lumping. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as in U.S. Pat. No. 2,983,692 by suspending the particles in water in a ratio between 0.3 to 1 and 1.5 to 1 (polymer to water) with the aid of suspending agent systems such as tricalcium phosphate in combination with a surfactant to promote wetting.

The blowing agents are compounds which are gases or which will produce gases on heating. Preferred blowing agents include aliphatic hydrocarbons containing from 4-6 carbon atoms in the molecule, such as butane, pentane, cyclopentane, hexane, cyclohexane and the halogenated hydrocarbons which boil at a temperature below the softening point of the polymer. Mixtures of these agents may also be used, such as a mixture of 40-60% n-pentane and 60-40% trichlorfluoromethane. Usually from 3-20% of blowing agent per 100 parts of polymers is incorporated by the impregnation.

The impregnation is conventionally carried out at temperatures ranging from about 60° to 150° C. Increasing the temperature makes the impregnation proceed at a faster rate.

The conjugated diene elastomers suitable for the present invention may be the homopolymers of conjugated dienes, such as butadiene, isoprene, 2,3-dimethylbutadiene, chloroprene and piperylene, or diene block copolymer rubbers. The preferred dienes are butadiene and isoprene.

The diene block copolymer rubbers are block copolymers of vinyl aromatic compounds and conjugated dienes wherein the blocks of conjugated dienes will have average molecular weights greater than the molecular weight of the combined blocks of vinyl aromatic compounds.

These block copolymers will generally contain 2-50% by weight vinyl aromatic compound and 50-98% by weight conjugated diene. More preferably, the vinyl content will be 10-40% with the diene content of 60-90%. The vinyl aromatic compounds may be styrene, alpha methylstyrene, nuclear methylstyrenes, ethylstyrene, isopropylstyrene tert-butylstyrene, chlorostyrenes, dichlorostyrenes and vinyl naphthalene and the like. The preferred compound is styrene.

Suitable block copolymer rubbers are the graded block, A-B diblock, the radial or star block, A-B-A triblock, and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted the later polymer formed is predominantly polyvinyl aromatic monomer. Such copolymer rubbers are also available commercially, as for instance Stereon 720, a Firestone Synthetic Rubber & Latex Co. product having 90% by weight butadiene and 10% by weight styrene with 55% by weight of the styrene appearing as polystyrene blocks.

Diblock copolymer rubbers are copolymers of A-B type wherein A represents a block of poly(vinyl aromatic monomer) and B represents a block of poly(conjugated diene). True diblock copolymer rubbers are made by polymerizing one of the monomers to essential completion and then adding the second monomer. Thus, butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75% by weight polybutadiene and 25% by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyanhydrides, polyesters, etc. Such radial block rubbers are also available commercially, as for instance Solprene 406 and Solprene 414, products of Phillips Petroleum Co. having 60% by weight polybutadiene and 40% by weight polystyrene.

Triblock copolymer rubbers are linear copolymers of the A-B-A or B-A-B type, wherein, again, A represents a block of poly(vinyl aromatic monomer) and B represents a block of poly(conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1107, a product of Shell Chemical Co. being a polystyrene-polyisoprene-polystyrene triblock rubber having 86% by weight polyisoprene and 14% by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus, U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Co., being a polystyrenepolyisoprene-polystyrene triblock rubber wherein the polyisoprene portion has been hydrogenated to a poly(ethylene/propylene) copolymer block.

The conjugated diene elastomers are useful in this invention in amounts between 0.05 and 0.25 weight percent based on the styrene polymer. The preferred amounts are between 0.08 and 0.20 weight percent based on polymer. The elastomers are added to the impregnation system as a solution of elastomer in a portion, or all, of the blowing agent.

In a typical process, the styrene polymer is suspended, in the form of beads or pellets, in an aqueous medium with the help of suspending agent system. The diene rubber, dissolved in a portion of the blowing agent is added, and the suspension is heated to the desired temperature. Then the remainder of the blowing agent is added and the mixture is maintained at the desired temperature until impregnation is complete. The suspension is then cooled to room temperature to allow separation of the impregnated beads from the aqueous phase.

It will be obvious to those skilled in the art that the coating process of the present invention may also be applied to polymer particles which contain various other additives, such as dyes, pigments, self-extinguishing agents, anti-static agents, plasticizers or the like.

The invention is further illustrated by the following examples wherein parts and percentages are parts and percentages by weight unless otherwise indicated.

EXAMPLE I

For this example, the diblock copolymer rubber used was a macromonomer prepared by the method of U.S. Pat. No. 3,862,101 as follows:

A one gallon stirred reactor was charged with 2,400 g of purified cyclohexane and heated to 60° C. A trace of diphenylethylene (0.2 g) was added to the cyclohexane by means of a hypodermic needle. A solution of sec-butyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 16.97 m mole of sec-butyllithium and 200 g styrene and the reactor held at 60° C. for 15 minutes. At this point, 466.5 g of isoprene was added to the reactor and the mixture held for 45 minutes to complete the polymerization of the isoprene. The diblock copolymer thus formed was analyzed by refractive index and found to be 30% by weight styrene and 70% by weight isoprene. There was then added 50 m mole ethylene oxide followed by 34 m moles of methacryloyl chloride. The final macromonomer was separated from the solvent and used as additive in the impregnations below.

To each of a series of 12 oz. Crown cap bottles was charged 100 g of water, 3.0 g of tricalcium phosphate, 0.03 g of sodium dodecylbenzene sulfonate, 100 g of polystyrene beads having bead size of predominantly through 16 and on 35 mesh, U.S. Standard Sieve, a solution of the amount of diblock macromonomer shown in Table I in sufficient n-pentane to make a 10% solution of elastomer in blowing agent and the remaining n-pentane to bring the total to 8.5 g of n-pentane.

The bottles were capped, rotated end-over-end for 1.5 hours to bring the temperature to 115° C. and maintained for 3 hours at 115° C. in an oil bath. The bottles were then cooled to room temperature, opened, acidified with hydrochloric acid, the beads separated from the aqueous medium, washed with water and air dried.

The beads were pre-expanded by heating for 2 minutes in steam at 5 psig. A weighed portion of pre-puffed beads were then screened through a ½ inch opening screen and the percent lumping determined by weighing the residue of fused pieces on the screen. The results are shown in Table I.

TABLE I

| Macromonomer Added, (g) | Lumping (%) |
|---|---|
| 0.0 | >60 |
| 0.04 | 30 |
| 0.05 | 17 |
| 0.10 | 0 |

EXAMPLE II

To illustrate the use of various types of conjugated diene elastomers as anti-lump agents, the agents were added at 0.10 g per 100 g of polystyrene to the formulation of Example I and cycled 3 hours at 115° C. In some instances, solution of the block rubber was aided by addition of a second solvent, such as cyclohexane or n-hexane. The results are shown in Table II.

TABLE II

| Elastomer | Lumping |
|---|---|
| None | >60 |
| Styrene-Isoprene Triblock (14/86)[a] | 0 |
| Polyisoprene[b] | 2 |
| Styrene-Butadiene Diblock (10/90)[d] | 5 |
| Styrene-Ethylene-Butylene-Styrene Block[c] | 35 |

[a]Kraton 1107, Shell Chemical Co.
[b]Natsyn 2200, Goodyear Chemical
[c]Kraton G-1652, Shell Chemical Co.
[d]Stereon-720, Firestone Synthetic Rubber & Latex Co.

We claim:
1. In a process for making expandable styrene polymer particles by suspending styrene polymer particles in water containing a suspending agent, heating the suspension to a temperature between 60° and 150° C., and thereafter impregnating said particles with a blowing agent, the improvement comprising dissolving 0.04 to 0.25 weight percent based on the polymer particles of a conjugated diene elastomer in a portion or all of the blowing agent, adding the solution of elastomer and the remaining blowing agent, it any, to the suspended polymer particles to impregnate the particles with blowing agent and coat the particles with elastomer, whereby the final particles have reduced lumping during pre-expansion with heat.

2. The process of claim 1 wherein said conjugated diene elastomer is selected from homopolymers of conjugated dienes and diene block copolymer rubbers.

3. The process of claim 2 wherein said conjugated diene block copolymer rubber is selected from the group consisting of graded block, A-B diblock, radial or star block, A-B-A triblock and A-B-A hydrogenated triblock rubbers, wherein A represents essentially polymerized vinyl aromatic monomer with a minor amount of conjugated diene, B represents essentially conjugated diene polymer with a minor amount of vinyl aromatic monomer, and the rubbers contain from 2 to 50% by weight vinyl aromatic monomer and 50 to 98% by weight of conjugated diene.

4. The process of claims 1, 2 or 3 wherein the diene in the conjugated diene elastomer is selected from the group consisting of butadiene, isoprene, chloroprene, 2,3-dimethylbutadiene and piperylene.

* * * * *